April 24, 1951 H. B. JOHNSON 2,549,816
PORTABLE SHELTER
Filed April 24, 1946 6 Sheets-Sheet 2
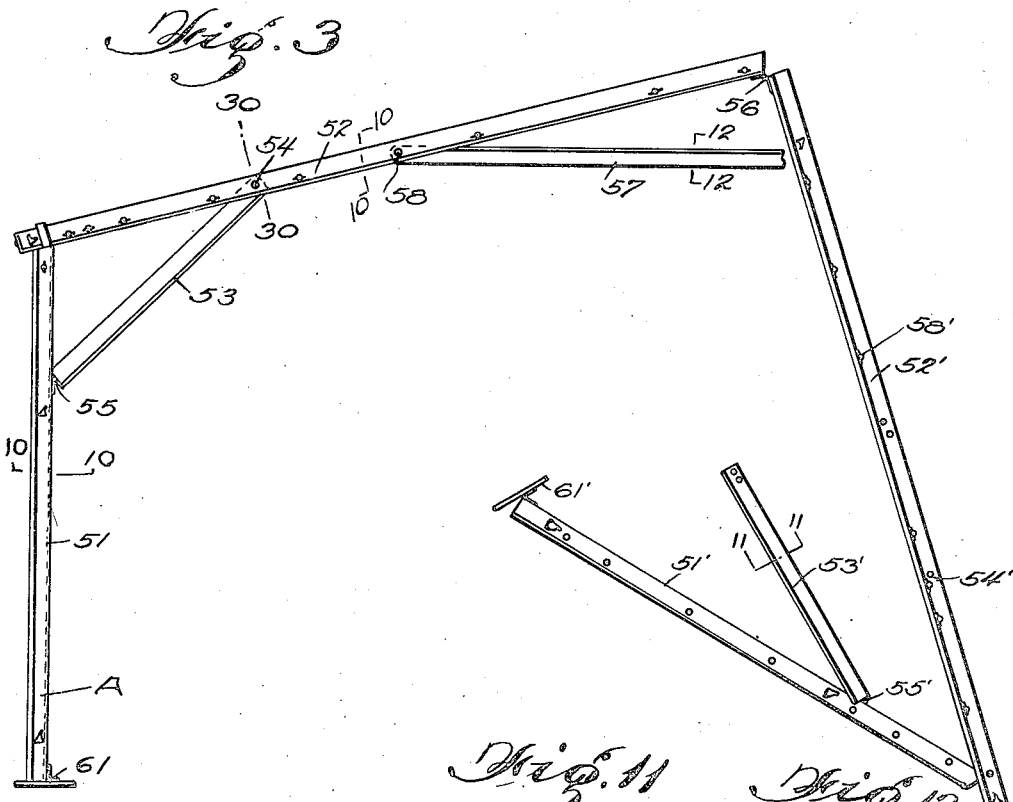
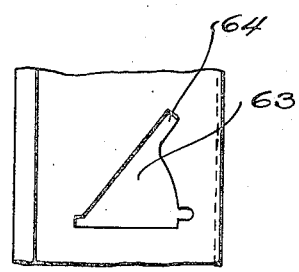
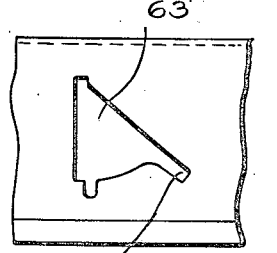
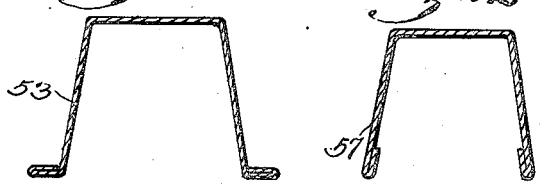
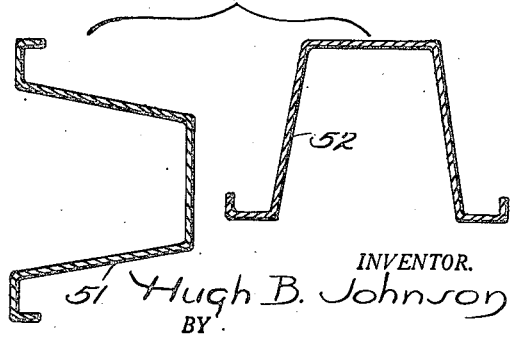
INVENTOR.
Hugh B. Johnson
BY
W. J. Eakston,
ATTORNEY April 24, 1951     H. B. JOHNSON     2,549,816
PORTABLE SHELTER
Filed April 24, 1946     6 Sheets-Sheet 3
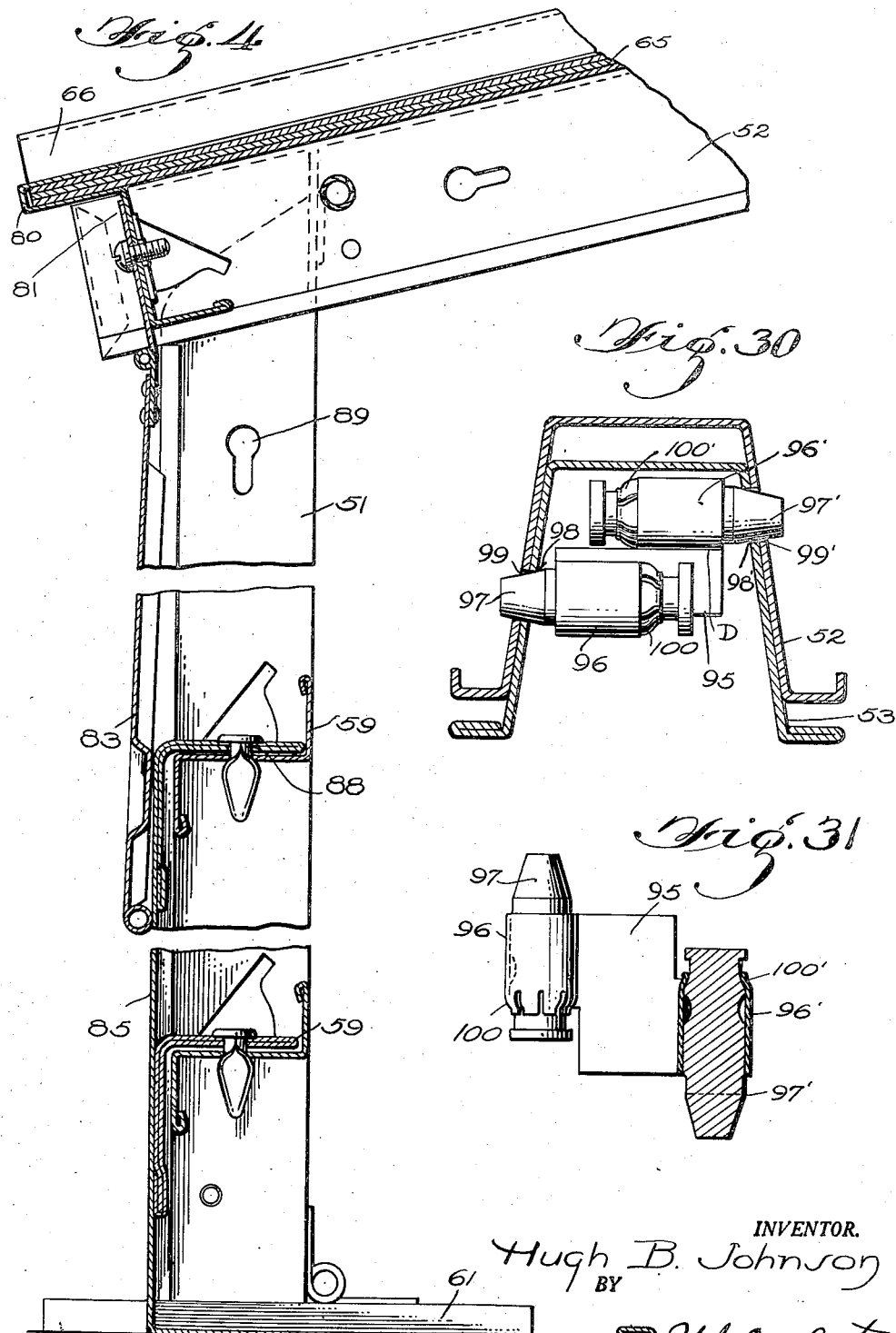
INVENTOR.
Hugh B. Johnson
BY
W. J. Eccleston
ATTORNEY

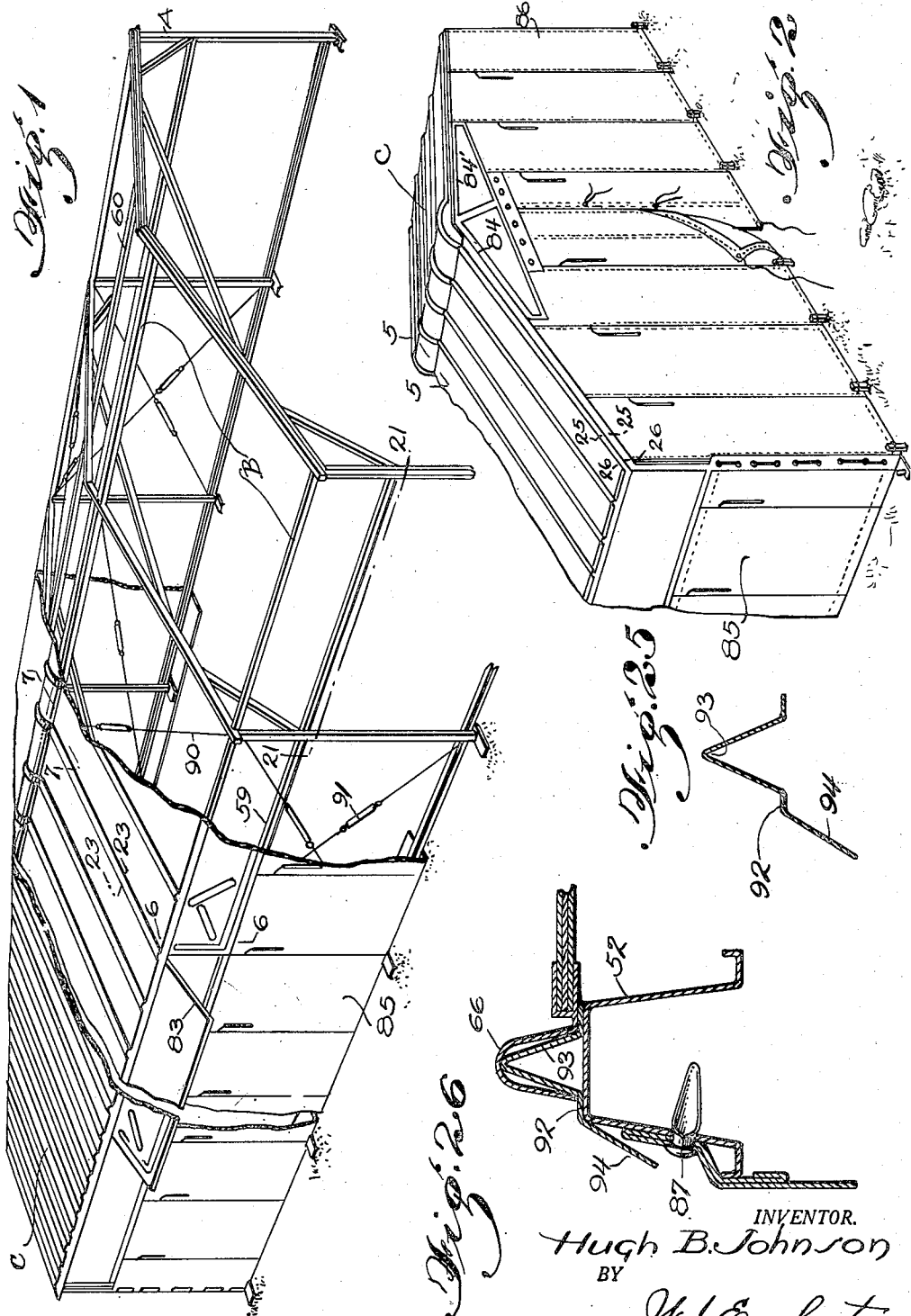

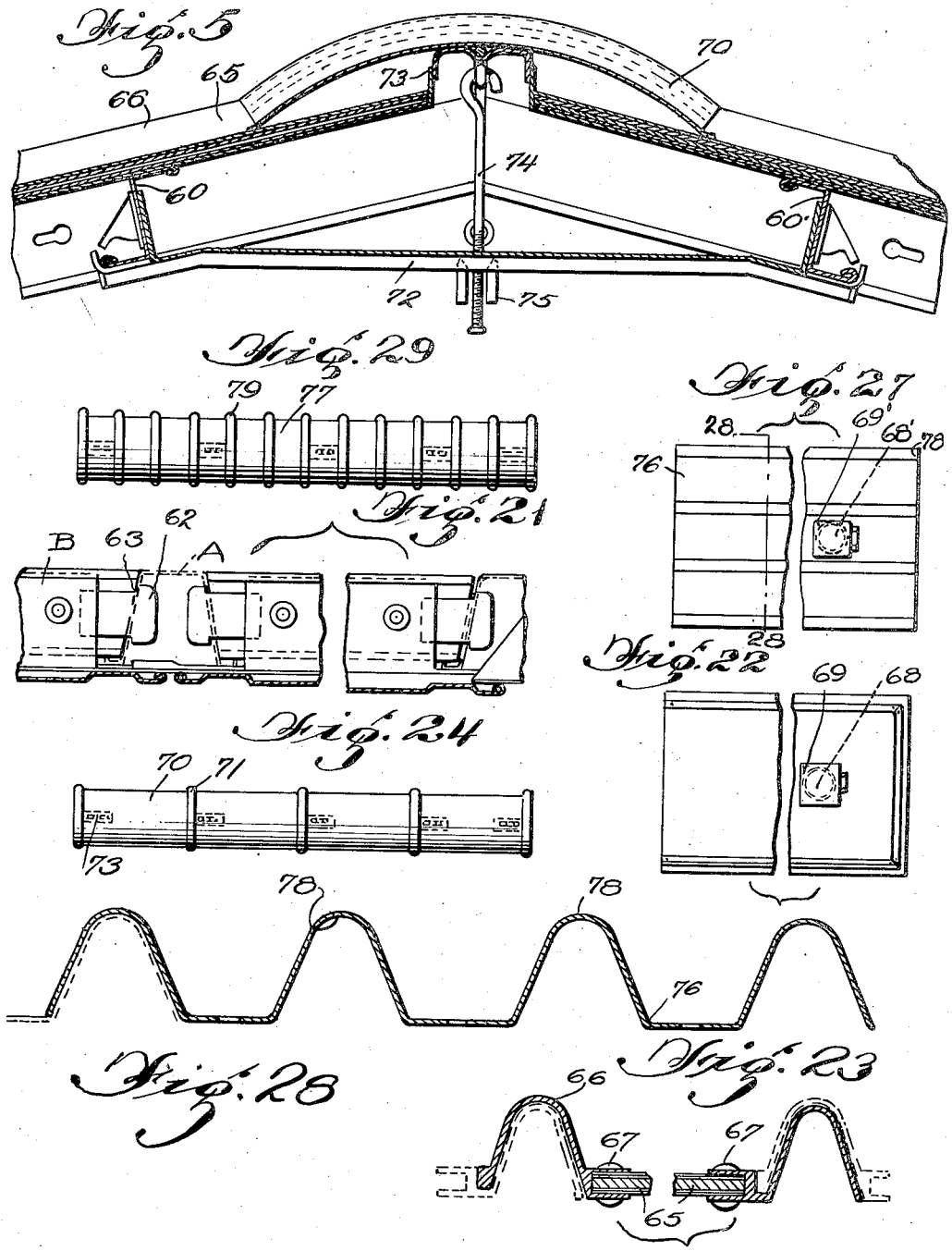

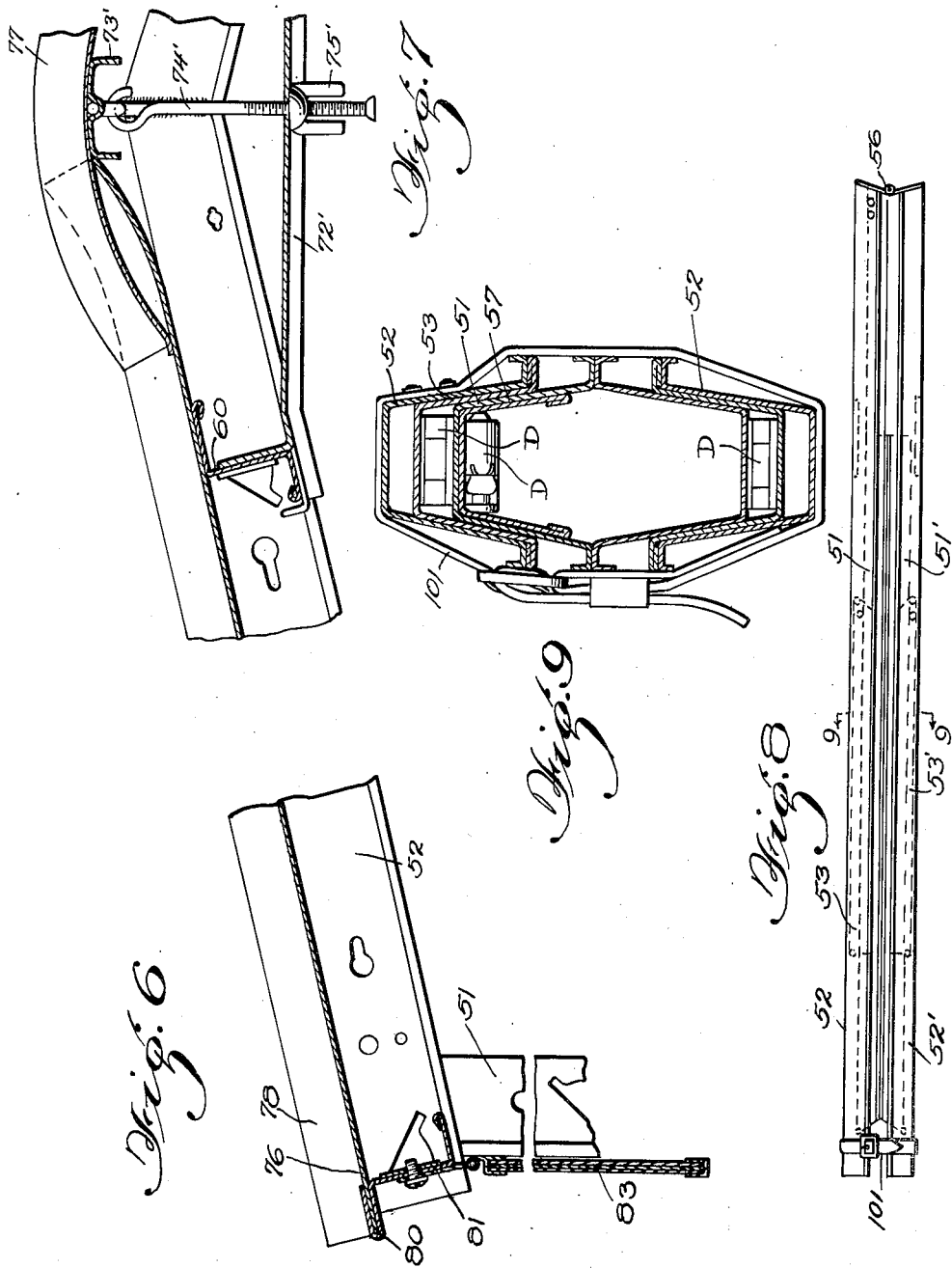

April 24, 1951     H. B. JOHNSON     2,549,816
PORTABLE SHELTER
Filed April 24, 1946     6 Sheets-Sheet 6
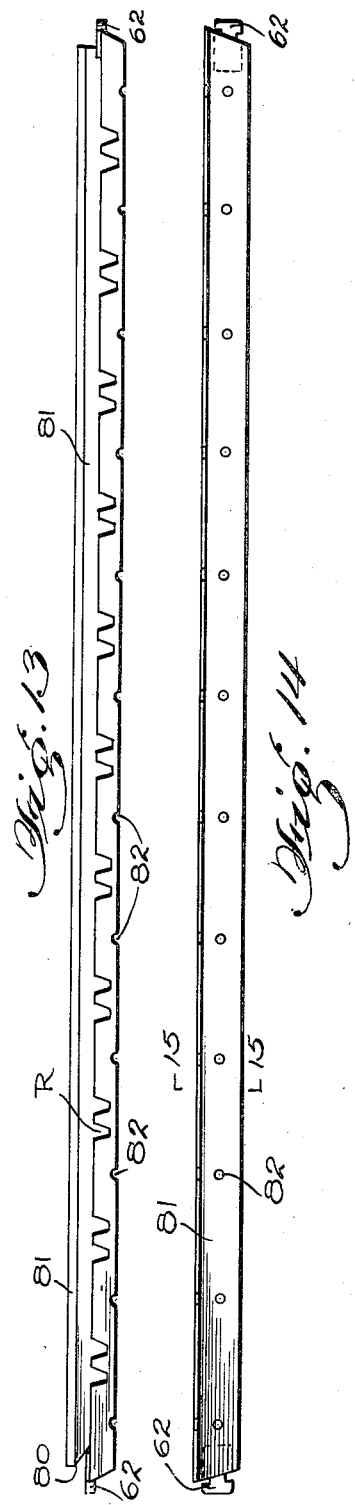
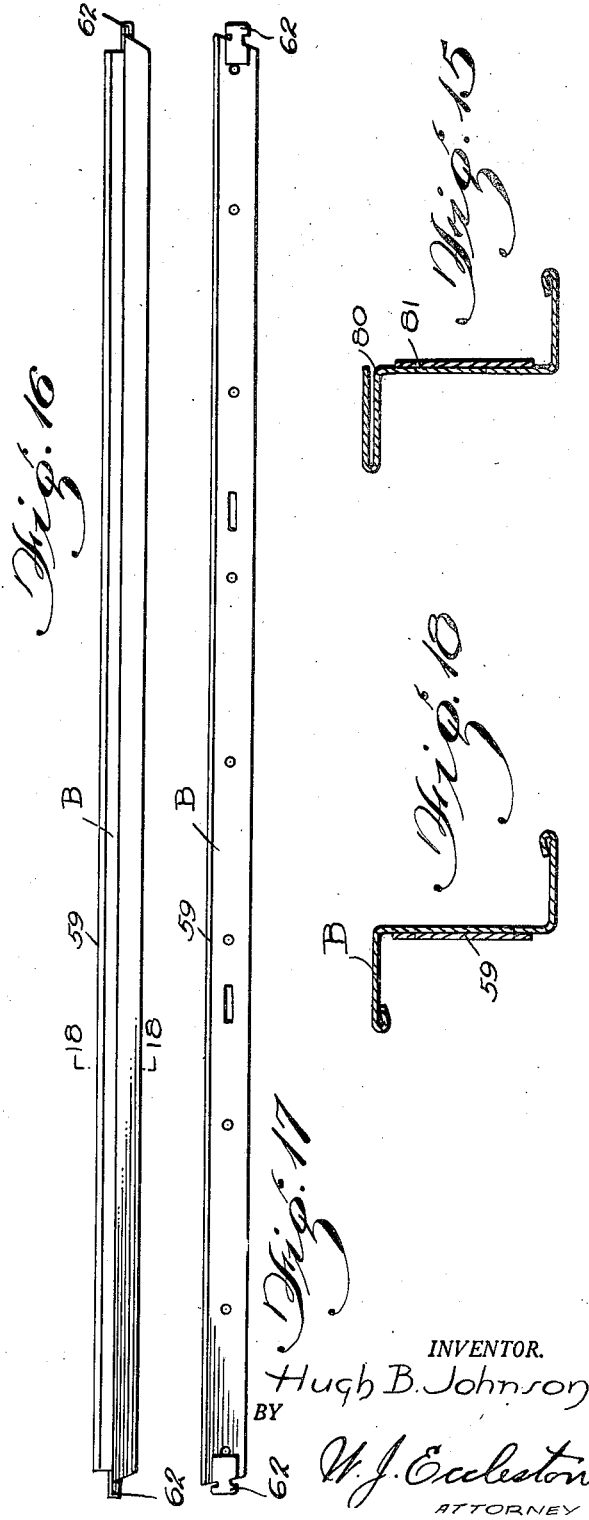
INVENTOR.
Hugh B. Johnson
BY
W. J. Eccleston
ATTORNEY Patented Apr. 24, 1951

2,549,816

UNITED STATES PATENT OFFICE 2,549,816

PORTABLE SHELTER

Hugh B. Johnson, Falls Church, Va.

Application April 24, 1946, Serial No. 664,445

9 Claims. (Cl. 108—1)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to a portable shelter, and particularly to a portable shelter of the metal knockdown frame type, which can be quickly disassembled, shipped compactly, and again speedily erected.

Temporary housing for troops in the field is almost as old as the history of mobile warfare itself. Tents have been used for this purpose from immemorial times until the present. Tents also have been, and still are widely used to house troops in semi-permanent encampments. While a tent, be it of the pyramidal or of the wall tent type, affords protection from the inclemencies of the weather, and is capable of being ventilated and heated, it is nevertheless an uncomfortable abode, and a prolonged stay in it is not helpful to good morale. The weight of conventional tentage is comparatively high in relation to the number of men accommodated, due to the heavy weight of the tent poles such as the center pole, ridge pole, etc.

Several inventions have been made with the object of overcoming these and other disadvantages of ordinary tentage; for instances the Nissen hut which has come into extended use for military as well as civilian usage since World War I. Other inventions have had as their object the provisions of portable shelters with knockdown or foldable frames, or both; but have not been widely adopted, either because of their lack of stability, or their high cost, or because of difficulties of assembly, disassembly or shipping.

The present invention has as one of its objects a sturdy frame for a portable shelter which consists of a plurality of portable sections that can be readily connected by horizontal members to form a house-shaped frame.

Another object of this invention is the provision of novel means whereby the aforesaid portable sections and horizontal members may be quickly attached to and detached from each other.

Elimination of a ridge pole, without sacrificing its functions is another object of the invention.

Still another object of this invention is a portable shelter frame which is firmly braced and capable of withstanding even severe storms when erected, but which can be quickly and compactly folded for shipment in a minimum of time and with a minimum of labor.

Means for firmly and tightly attaching a roof to the shelter frame, operable from the inside of the erected shelter, and thereby avoiding any need for climbing the roof of the shelter, form another object of the present invention.

Still another object of this invention is the light weight of the shelter in relation to the area covered by the same.

These and other objects of the invention will become readily apparent from the following description and claims and from the appended drawings.

A preferred embodiment of a portable shelter in accordance with the present invention is illustrated in the appended drawings, without, however, limiting the invention to any of the details set forth therein.

In the drawings:

Fig. 1 is a perspective view, partly broken away, of the erected shelter;

Fig. 2 is a perspective end view of the shelter;

Fig. 3 shows in elevation a foldable bent, serving as an upright element of the shelter;

Fig. 4 is a view in elevation, partly broken away, of a post and rafter, forming part of the foldable bent illustrated in the preceding figure, and showing in detail means for attaching a canvas wall and a roof panel to the frame;

Fig. 5 is a detailed view of the ridge portion of the frame, showing, in section along lines 5—5 of Fig. 2, means for attaching the roof to the frame at the ridge;

Fig. 6 is a detailed sectional view, through line 6—6 of Fig. 1, of means for attaching a ventilation flap to the eave portion of the frame;

Fig. 7 shows in section through line 7—7 of Fig. 1, means for attaching a modified roof panel to the ridge portion of the frame;

Fig. 8 is a side elevation of the bent of Fig. 3, folded for transport.

Fig. 9 is a section through Fig. 8 along line 9—9.

Fig. 10 is a section through a post and a rafter, taken through lines 10—10 of Fig. 3;

Fig. 11 is a section through a brace, along line 11—11 on Fig. 3;

Fig. 12 is a section through a tie rod, taken along lines 12—12 of Fig. 3;

Fig. 13 is a side elevation and Fig. 14 is a plan view of a horizontal eave member;

Fig. 15 is a section through Fig. 14 along line 15—15;

Fig. 16 is a side elevation; Fig. 17 is a plan view, and Fig. 18 is a sectional view along lines 18—18 of Fig. 16, of another horizontal element of the frame, serving as a girt or as a roof purlin;

Fig. 19 is a detailed elevational view of a bent, as shown in Fig. 3, showing the place of juncture to a horizontal member;

Fig. 20 is an elevational view of a modification of the element illustrated in Fig. 19;

Fig. 21 is a section through Fig. 1 along line 21—21, showing in detail a releasable joint between vertical and horizontal members.

Fig. 22 is a plan view of a wooden roof panel, partly broken away;

Fig. 23 illustrates in section taken along line 23—23 of Fig. 1, roof ribs for holding the roof panel illustrated in the preceding figure;

Fig. 24 is a plan view of a ridge cap, adapted to retain wooden roof panels illustrated in Fig. 22;

Fig. 25 shows a section through a rake strip, taken along line 25—25 of Fig. 2;

Fig. 26 illustrates in a sectional view taken along lines 26—26 of Fig. 2, the assembled relation of a roof panel, rake strip, and rafter;

Fig. 27 is a plan view, and Fig. 28 is a sectional view, taken along line 28—28 of Fig. 27 of a metal roof panel, constituting a modification of the roof panel illustrated in Fig. 22;

Fig. 29 is a plan view of a ridge cap to be used in connection with the metal roof panels illustrated in Figs. 27 and 28;

Fig. 30 is a sectional view, taken along line 30—30 of Fig. 3, of a releasable connection between rafter and brace of the shelter; and Fig. 31 shows, partly in elevation and partly in section, a detailed view of the connecting means of Fig. 30.

More particularly, A denotes a foldable bent, consisting of posts 51, 51', rafters 52, 52', braces 53, 53' detachably joined to the rafters at 54, 54' and hinged to the posts at 55, 55', and a central hinge 56 at the ridge. A tie rod 57 detachably connects to the rafters at 58, 58', and spreads them apart when assembled. Posts, rafters, and braces are of channel cross section, with the walls of the channel preferably forming obtuse angles with the web; the purpose of this shape is rigidity and a compact nesting of the component parts of bent A, when it is folded for shipping. Elongated members B of substantially Z-shaped cross section constitute girts 59 and roof purlins 60. Hinged foot plates 61, 61' are provided at the lowermost ends of posts 51, 51'.

Shelters of predetermined length can be erected by joining together a plurality of bents A by means of horizontal members B. If, for instance, horizontal members B, all of which have the same length, are made eight feet long, and it is desired to erect a shelter thirty-two feet long, five bents are connected together by four sets of horizontal members.

A male locking element 62, having a shank and enlarged head resembling a T, is provided at each narrow end of each elongated member B. Excised portions 63, 63' are located on bent A in those places at which the horizontal members are to be joined to the bent. The excised portion resembles a 45° sector of a circle the radius of which is smaller than the width of the T-head of element 62; one radial line of the sector is elongated to form slot 64 or 64', which is of sufficient length to permit passage of the T-head of element 62. The joining of horizontal members B to bents A is effected by inserting locking element 62 of member B into slot 64 or 64', and locking them together by rotating member B approximately 45°, which causes locking element 62 to be retained within sector 63 or 63'. The relative position of section 63 or 63' and slot 64 and 64' varies according to the angle of the portion of the bent wherein the sector and slot is excised. Thus, in Fig. 19 showing a detail of vertical post 51, the slot 64 above sector 63 points upwardly. On the other hand, in rafters 52, 52', a detail of which is illustrated in Fig. 20, the relative position of sector 63', 64' resembles that of sector 63 and 64, with the difference that the slot 64' points downwardly, instead of upwardly.

It is contemplated that the shelter, in accordance with the present invention, may be used either with wooden or metal roof plates. Wooden roof plates 65 are preferably made of plywood in order to eliminate warpage; each panel is bounded by a pair of metal ribs 66 of inverted channel cross section to which the wooden panels are attached by rivets 67 or other conventional means. In assembling the roof, hollow rib 66 of one plate is placed over the rib of the adjacent plate, as is shown in Fig. 23. Some or all of the roof panels are provided with a circular hole 68 for the passage of a stove pipe (not shown); hole 68 is closed by means of hinged cover 69 in the absence of a stove pipe. A ridge cap 70 of semi-circular cross section, and having hollow ribs 71 rests on roof panel 66 in such a manner that ribs 71 overlie the inverted channel ribs 66. As the shelter does not have a ridge pole, the ridge cap is releasably connected to two parallel roof purlins 60, 60' by means of a cross brace 72 which bears against the roof purlins from below; an elongated rod member such as bolt 74 hingedly depends from a bracket 73 on the inner face of ridge cap 70 and passes through the center of cross brace 72. Cross brace 72 can be tightened on bolt 74 by means of wing nut 75 which is operated from the inside of the shelter, thus eliminating the need for climbing on the roof C in order to attach the roof panels to the frame.

In the modification which uses metal roof plates instead of plywood roof panels, ribbed plates 76 are attached to the ridge by transversely ribbed ridge cap 77; and the hollow ribs 79 of ridge cap 77 fit over the hollow ribs 78 of plate 76 so as to prevent horizontal displacement of the roof plates. 68' and 69' are a hole for a stove pipe (not shown) and cover therefor. The ridge cap 77 is releasably attached to roof purlins 60, 60' in a manner analogous to the fastening of ridge cap 70, namely by means of a cross brace 72', a bolt 74' hingedly depending from a bracket 73' on the inner face of ridge cap 77, and a wing nut 75', for tightening cross brace 72' on bolt 74'.

The lower edges of roof panels 65 or roof plates 76 are received in a channel 80 of elongated eave purlin 81 and so are prevented from sliding off downwardly; the roof ribs fit in corresponding recesses R of eave purlins 81. The arrangement is illustrated in detail in Figs. 4 and 6. The elongated eave member is also provided with a rain-water trough equipped with weep holes 82.

Rectangular ventilation flaps 83 are hingedly attached to the eave purlins; and ventilation flaps 84, 84' of substantially triangular shape hingedly depend from the end rafters 52, 52'.

Canvas side walls 85 and end walls 86 are attached to the frame in conventional manner, such as by the compressible shank spring clips 87 passing through grommet holes 88 in the canvas and through key-slot holes 89 in the frame.

A canvas floor (not shown) may be likewise attached to the frame, if desired.

The erected frame may be strengthened, if desired, by diagonally arranged ropes and turnbuckles 90, 91.

To effect assembly of the roof panels to the frame in such a manner that water will not leak through, elongated rake strips or flashing members 92 are provided for insertion between an end rafter 52 or 52' and the outermost roof rib 66. The rake strip 92 comprises an elongated inverted groove 93, preferably of triangular cross-section, which fits inside the roof rib; and inclined water-deflecting portion 94, but preferably offset therefrom is integral with the grooved portion. When the shelter is assembled, the rake strip 92 is positioned on the rafter in such a manner that the inverted groove rests on the rafter and the water-deflecting portion points outwardly and downwardly; the roof panel is then placed on the rafter and rake strip, with roof rib 66 overlying grooved portion 93 of the rake strip and resting thereon on the offset between grooved portion 93 and inclined portion 94. When the roof panels or plates are then tightened by means of the brace arrangement heretofore described, a water impermeable seal between roof and rafters is effected.

The structural detail illustrated in Figs. 30 and 31 is particularly useful in quick assembly and disassembly of the frame. It essentially consists of a double connector pin D used inside the channel of brace 53 and 53'. A plate 95 is welded to the inside of the channel of the brace near its end; a parallel pair of sleeves 96, 96' is integral with plate 95. These sleeves house a pair of retractable pins 97, 97', the sleeve and pin being so dimensioned that the pin cannot be retracted far enough to drop from the channel. In line with the outwardly pointing ends of pin 97, 97' are holes 98, 98' through the wall of the channel, and registering holes 99, 99' are provided through the wall of the channel of rafter 52. In attaching the free end of brace 53 to rafter 52 at 54, holes 98 and 99, and holes 98' and 99' are brought into alignment, and pins 97, 97' are slid outwardly through holes 98, 99 and 98', 99'. Conversely, when the shelter is disassembled, the pins are retracted so as to clear the holes. Spring fingers 100, 100' on sleeve 96, 96' hold the pins in retracted position until the shelter is again assembled. The same retractable connector pin device is placed inside the channel of tie rod 57 at both ends thereof; and registering holes for releasable attachment of tie rod 57 to rafters 52, 52' are provided at 58, 58'.

The foregoing description of the individual parts of the shelter also describes the method for assembling it. In disassembling the shelter, the assembling steps are reversed. For shipment, the elongated girt and purlin members B are conveniently bundled and the roof plates C stacked in conventional manner. The bents A are so shaped and dimensioned that the parts nest inside each other, when folded. This is readily apparent from Fig. 3 which shows how brace 53' rests on post 51', and how both are nestable inside rafter 52'. The left and right portion of each bent are foldable toward each other around ridge hinge 56. A compact bundle of each bent is thus formed, as shown in Figs. 8 and 9; a tie rod 57 and a stack of elongated members B is placed inside the bundle; and the bundle is finally tie or strapped e. g., by means of strap 101, and is ready for shipment.

The several advantages of a shelter in accordance with my invention are obvious from a description of its structure. It will be understood that changes in the arrangement or dimensions of the parts of the shelter set forth in the specific example described can be made without departing from the spirit of the invention and without sacrificing any of its objects. Such modifications come within the scope of my invention, and I consequently intend to claim my invention broadly, and to be limited only by the appended claims.

I claim:

1. In a frame for a portable shelter, said frame including a roof purlin: means for releasably attaching roof panels to said frame, said means being operable from the inside of the erected frame and comprising a ridge member engaging a roof panel, an elongated rod member hingedly depending from said ridge member, and a brace engaging said roof purlin and tightenable on said rod member.

2. In a frame for a portable shelter, said frame including a roof purlin: means for releasably attaching roof panels to said frame, said means being operable from the inside of the erected frame and comprising a ridge member engaging a roof panel, an elongated rod member hingedly and removably depending from said ridge member, and a brace engaging said roof purlin and tightenable on said rod member.

3. In a portable shelter; a knockdown roof assembly comprising in combination two pairs of converging roof rafter members, at least two elongated roof purlin members, means for releasably interconnecting said roof purlin members in said rafter members by relative rotation, a plurality of roof panels positioned on said roof purlin members, a ridge member positioned on said roof panels, a rod depending from said ridge member, means for assembling said rod and said rib member from the inside of said shelter, a cross brace on said rod and engaging said roof purlin members, and means for reciprocating said cross brace on said rod, whereby said assembly may be set up or disassembled from the inside of said shelter.

4. In a portable shelter; a knockdown roof assembly comprising in combination two pairs of converging roof rafter members, at least two elongated roof purlin members, means for releasably interconnecting said roof purlin members in said rafter members by relative rotation, a plurality of roof panels positioned on said roof purlin members, a ridge member positioned on said roof panels, a rod hingedly depending from said ridge member, means for assembling said rod and said rib member from the inside of said shelter, a cross brace on said rod and engaging said roof purlin members, and means for reciprocating said cross brace on said rod, whereby said assembly may be set up or disassembled from the inside of said shelter.

5. In a portable shelter comprising a frame, rafter members, and roof panels, at least one of said roof panels having an inverted channel rib: means for attaching said last-named roof panel to said frame, said means comprising a ridge member engaging said roof panel, an elongated member depending from said ridge member for engaging said frame, means for tightening said ridge member on said frame, and a flashing member positioned on said rafter and fitted inside the channel rib of said roof panel; whereby upon the tightening of said elongated member on said frame, said flashing member affords a watertight seal between said roof panel and said rafter.

6. In a portable shelter comprising a frame, rafter members, and roof panels, at least one of said roof panels having an inverted channel rib: means for attaching said last-named roof panel to said frame, said means comprising a ridge member engaging said roof panel, an elongated member depending from said ridge member for engaging said frame, means for tightening said ridge member on said frame, and an elongated grooved flashing member positioned on said rafter and fitted inside the channel rib of said roof panel; whereby upon the tightening of said elongated member on said frame, said flashing member affords a water-tight seal between said roof panel and said rafter.

7. In a portable shelter comprising a frame, rafter members, and roof panels, at least one of said roof panels having an inverted channel rib: means for attaching said last-named roof panel to said frame, said means comprising a ridge member engaging said roof panel, an elongated member depending from said ridge member for engaging said frame, means for tightening said ridge member on said frame, and a flashing member positioned on said rafter and fitted inside the channel rib of said roof panel, said flashing member having an elongated grooved portion of triangular cross-section and of substantially the same height and width as said channel rib; whereby upon the tightening of said elongated member on said frame, said flashing member affords a water-tight seal between said roof panel and said rafter.

8. A roof assembly for a portable shelter: said roof assembly comprising a roof panel having an inverted channel rib and a flashing member having an elongated grooved portion fitted inside said channel rib and an elongated downwardly inclined portion offset from said grooved portion, said roof panel resting on said flashing member at the offset between said two portions.

9. A roof assembly for a portable shelter: said roof assembly comprising a roof panel having an inverted channel rib and a flashing member having an elongated grooved portion of triangular cross-section and of substantially the same height and width as said channel rib, said grooved portion of said flashing member being fitted inside said channel rib, and said flashing member also having an elongated downwardly inclined portion offset from said grooved portion, said roof panel resting on said flashing member at the offset between said two portions.

HUGH B. JOHNSON.

REFERENCES CITED

The following references are of record in the file of this patent:

UNITED STATES PATENTS

| Number | Name | Date |
|---|---|---|
| 3,387 | Guild | Dec. 20, 1843 |
| 720,344 | Hagedorn | Feb. 10, 1903 |
| 958,276 | Pence | May 17, 1910 |
| 1,124,474 | Leonard | Jan. 12, 1915 |
| 1,178,333 | Niernsee | Apr. 4, 1916 |
| 1,450,129 | Batty | Mar. 27, 1923 |

FOREIGN PATENTS

| Number | Country | Date |
|---|---|---|
| 34,295 | France | 1928 |

(Addition to No. 571,518)